US007287590B1

(12) United States Patent
Sullivan et al.

(10) Patent No.: US 7,287,590 B1
(45) Date of Patent: Oct. 30, 2007

(54) INTERNAL BREAKER FOR OILFIELD FLUIDS

(75) Inventors: Philip F. Sullivan, Bellaire, TX (US);
Belgin Baser, Houston, TX (US);
Carlos Abad, Richmond, TX (US);
Yiyan Chen, Richmond, TX (US);
Mehmet Parlar, Sugar Land, TX (US);
Gregory Kubala, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 11/532,559

(22) Filed: Sep. 18, 2006

(51) Int. Cl.
*E21B 43/25* (2006.01)
*E21B 43/26* (2006.01)

(52) U.S. Cl. .......... 166/300; 166/305.1; 166/308.2; 507/201; 507/209; 507/265; 507/921

(58) Field of Classification Search .......... 166/278, 166/300, 305.1, 308.2; 507/201, 209, 265, 507/902, 921
See application file for complete search history.

(56) References Cited

U.S. PATENT DOCUMENTS

| 5,501,275 | A | 3/1996 | Card et al. |
| 5,551,516 | A | 9/1996 | Norman et al. |
| 5,782,300 | A | 7/1998 | James et al. |
| 5,813,466 | A * | 9/1998 | Harris et al. ............ 166/300 |
| 5,964,295 | A | 10/1999 | Brown et al. |
| 5,979,555 | A | 11/1999 | Gadberry et al. |
| 5,979,557 | A | 11/1999 | Card et al. |
| 6,035,936 | A | 3/2000 | Whalen |
| 6,140,277 | A | 10/2000 | Tibbles et al. |
| 6,192,985 | B1 * | 2/2001 | Hinkel et al. ............ 166/280.1 |
| 6,258,859 | B1 | 7/2001 | Dahayanake et al. |
| 6,306,800 | B1 | 10/2001 | Samuel et al. |
| 6,399,546 | B1 | 6/2002 | Chang et al. |
| 6,509,301 | B1 | 1/2003 | Vollmer |
| 6,605,570 | B2 * | 8/2003 | Miller et al. ............ 507/211 |
| 6,637,517 | B2 | 10/2003 | Samuel et al. |
| 6,667,280 | B2 | 12/2003 | Chang et al. |
| 6,881,709 | B2 * | 4/2005 | Nelson et al. ............ 507/203 |
| 6,908,888 | B2 * | 6/2005 | Lee et al. ............ 507/219 |
| 7,028,775 | B2 | 4/2006 | Fu et al. |
| 7,052,901 | B2 * | 5/2006 | Crews ............ 435/281 |
| 7,084,095 | B2 * | 8/2006 | Lee et al. ............ 507/261 |
| 7,216,704 | B2 * | 5/2007 | Hanes et al. ............ 166/278 |
| 2002/0076803 | A1 * | 6/2002 | Crews ............ 435/266 |
| 2003/0119680 | A1 | 6/2003 | Chang et al. |
| 2006/0041028 | A1 * | 2/2006 | Crews ............ 516/135 |
| 2006/0211775 | A1 * | 9/2006 | Crews ............ 516/109 |
| 2006/0211776 | A1 * | 9/2006 | Crews ............ 516/194 |
| 2007/0056737 | A1 * | 3/2007 | Crews et al. ............ 166/300 |

FOREIGN PATENT DOCUMENTS

| GB | 2366307 A | 6/2002 |
| WO | 0211874 A1 | 2/2002 |
| WO | 02064945 A1 | 8/2002 |

* cited by examiner

*Primary Examiner*—George Suchfield
(74) *Attorney, Agent, or Firm*—Darla Fonseca; David Cate; Robin Nava (57) ABSTRACT

Delayed breakers are given that break viscoelastic surfactant fluids inside the pores of formations into which the fluids have been injected. The breakers comprise proteins, proteins that contain breakers, or cells that contain breakers. Proteins become breakers, and proteins and cells release breakers, due to a triggering mechanism that may be, for example, a change in temperature, pH, or salinity.

18 Claims, 10 Drawing Sheets

INTERNAL BREAKER FOR OILFIELD FLUIDS

CROSS-REFERENCE TO RELATED APPLICATIONS

This application is related to copending application U.S. Ser. No. 11/532,553, "Internal Breaker for Oilfield Treatments," inventors Jesse Lee, Philip Sullivan, Erik Nelson, Yiyan Chen, Carlos Abad, Belgin Baser, and Lijun Lin, filed Sep. 18, 2006. This application is also related to copending application U.S. Ser. No. 11/532,565, "Oxidative Internal Breaker for Viscoelastic Surfactant Fluids," inventors Lijun Lin, Carlos Abad, Belgin Baser, Philip Sullivan, Yiyan Chen, and Jesse Lee, filed Sep. 18, 2006. This application is also related to copending application U.S. Ser. No. 11/532, 705. "Method for Limiting Leakoff and Damage in Hydraulic Fractures, inventors Richard Hutchins, Marie Dessinges, and Carlos Abad, filed Sep. 18, 2006. These applications are all assigned to the assignee of the present application and are hereby incorporated in their entirety.

BACKGROUND OF THE INVENTION

The Invention relates to recovery of oil and gas from wells, and more particularly to breaking fluids inside formation pores when using viscoelastic surfactant fluid systems (VES's) as carrier fluids and treatment fluids.

There are many applications in which breakers are needed to decrease the viscosity of treatment fluids, such as fracturing, gravel packing, and acidizing fluids, viscosified with polymers or crosslinked polymers or viscoelastic surfactants. Most commonly, these breakers act in fluids that are in gravel packs or fractures; some breakers can work in fluids in formation pores. Breakers decrease viscosity by degrading polymers or crosslinks when the viscosifiers are polymers or crosslinked polymers. Breakers decrease viscosity by degrading surfactants or destroying micelles when viscosifiers are viscoelastic surfactant fluid systems. Most breakers are solids, for example granules or encapsulated materials, that do not enter the formation.

There is sometimes a need to break viscous fluids within the pores of formations, for example when viscous fluids enter formations during fracturing, gravel packing, acidizing, matrix dissolution, lost circulation treatments, scale squeezes, and the like. Breakers that are effective inside formations will be called internal breakers here. These fluids that enter the formation may be main treatment fluids (such as fracturing fluids) or they may be secondary fluids (such as flushes or diversion fluids such as viscoelastic diverting acids). Typically it is necessary that the break be delayed, that is that the breaker not act until after the fluid has performed its function.

Compositions and treatment methods using a delayed internal breaker, or a precursor that after a delay releases or decomposes or transforms into an internal breaker without mechanical or chemical action by the operator, would be of value. It would be desirable to have a number of such materials so that they could be used under different subterranean conditions, for example different temperatures and different formation fluid chemistries.

SUMMARY OF THE INVENTION

One embodiment of the Invention is a method of treating a subterranean formation penetrated by a wellbore involving a) injecting into the formation a fluid containing a non-polymeric viscosifier that acts by creating a three dimensional structure in the fluid, and a breaker involving a protein, and b) allowing the protein to disrupt the structure. The protein is selected from fibrous proteins (for example, cytoskeletal proteins and extracellular matrix proteins), globular proteins (for example, plasma proteins, coagulation factors, hemoproteins, hormones, DNA-binding proteins, and immune system proteins), and enzymes. The protein is, for example, egg white or alpha-amylase. In yet another embodiment, the protein is selected from oxidoreductases, transferases, hydrolases, lyases, isomerases, and ligases.

In another embodiment, the non-polymeric viscosifier is a viscoelastic surfactant, for example a betaine or an amidoamine oxide.

In yet another embodiment, the fluid also contains a sugar, for example, sucrose, d-fructose, or d-sorbitol.

In yet another embodiment, the step of allowing the protein to disrupt the structure is delayed by enclosing the protein in a material selected from fatty acids, polyvinyl alcohols, synthetic resins, phenolic resins, acrylate polymers and copolymers, lactic acid and glycolic acid polymers and copolymers, and mixtures of these materials.

Another embodiment is a method of treating a subterranean formation penetrated by a wellbore involving a) injecting into the formation an aqueous fluid viscosified with a non-polymeric viscosifier, that acts by creating a three dimensional structure in the fluid, and a globular protein that contains a breaker for the viscosifier, and b) allowing the protein to release the breaker. The globular protein is, for example, selected from albumins, caseins, and glutens. The breaker in the globular protein is selected, for example, from long chain alcohols, fatty acids, fatty acid esters, mono, di or triglicerides of fatty acids, long chain alcohol phosphate esters, diacid esters, aliphatic hydrocarbons, aromatic hydrocarbons, and mixtures of these materials.

Another embodiment is a method of treating a subterranean formation penetrated by a wellbore involving a) injecting into the formation a fluid viscosified with a non-polymeric viscosifier that acts by creating a three dimensional structure in the fluid, a precursor of a breaker for the viscosifier (the precursor capable of being degraded by an enzyme into a breaker for the viscosifier), and an enzyme capable of degrading the precursor, and b) allowing the enzyme to degrade the precursor to release the breaker. The precursor is, for example, selected from di or triglycerides of fatty acids, and phospholipids.

Yet another embodiment of the Invention is a fluid composition containing a non-polymeric viscosifier, that acts by creating a three dimensional structure in the fluid, and a component selected from a protein, a protein containing a breaker for the viscosifier, and a combination of a precursor capable of being degraded by an enzyme into a breaker for the viscosifier and an enzyme capable of degrading the precursor.

DETAILED DESCRIPTION OF THE INVENTION

For viscosified fluids used in oilfield treatments, it is important that there be a mechanism by which the viscosity can be reduced (that is, the fluid can be broken). Typically, breakers are added to the fluid. Typically, the action of the breaker is delayed or requires a trigger, such as crushing of encapsulated breakers, so that the fluid may perform its function before the break occurs. Proper placement is an important feature for any breaker; it must be with the fluid that is to be broken. Once a fluid invades a formation, most conventional breakers (such as encapsulated oxidizing agents) cannot clean it up because they form or are incorporated in a filter cake and do not enter the formation. An alternative to including the breaker in the fluid, subsequently adding another fluid, such as an acid, will be inefficient because of the poor fluid-to-fluid contact. We have found that including certain proteins, for example certain enzymes, in certain forms in a VES-based fluid provides a delayed break inside formation pores.

The Invention will be described primarily in terms of hydraulic fracturing, gravel packing, acidizing, and fracture acidizing, although it is to be understood that the Invention may be used in many other ways, for example many other oilfield treatments. In hydraulic fracturing, most of the injected fracturing fluid contains a proppant such as sand or synthetic ceramic beads, so that when the pressure is released the proppant is trapped between the fracture faces and prevents the fracture from completely closing, thus leaving a flowpath open. The injected fracturing fluid is normally viscosified. Increased viscosity results in formation of a wider fracture, thus a larger flowpath. A minimal viscosity is also required to transport adequate amounts of proppant; the actual viscosity required depends primarily upon the fluid flow rate, the elasticity of the fluid, and the density of the proppant. In a typical fracturing process, such as hydraulic fracturing with aqueous fluids, the fracture is initiated by first pumping a high viscosity fluid with good to moderate leak-off properties, and typically no proppant, into the formation. This initial fluid, typically referred to as a "pad", is usually followed by a second fluid (fracturing fluid) of similar viscosity carrying an initially low concentration and then a gradually or step-wise increasing concentration of proppant into the extended fracture or fractures. The pad initiates and propagates the fracture but does not need to carry proppant. All the fluids tend to "leak off" into the formation from the fracture being created or extended. Commonly, by the end of the job the entire volume of the pad will have leaked off into the formation. This leak-off is determined and controlled primarily by the properties of the fluid (and additives it may contain, such as fluid loss additives or FLA's), the pumping rate and pressure, and the properties of the rock. A certain amount of leak-off greater than the minimal possible may be desirable, for example a) if the intention is to place some fluid in the rock to change the rock properties or to flow back into the fracture during closure, or b) if the intention is deliberately to cause what is called a "tip screen-out", or "TSO", a condition in which the proppant forms a bridge at the some point in the fracture, stopping the lengthening of the fracture and resulting in a subsequent increase in the fracture width. In acid fracturing, the fracture fluid is an acid (or other formation dissolving fluid such as a chelant-containing fluid) and the fluid normally does not contain proppant (although it may); the fracture is held open by asperities in the fracture faces caused by differential etching of the formation material. In matrix acidizing, an acid or other formation dissolving fluid is injected below fracture pressure and the fluid enters the formation and dissolves damaging materials and/or a portion of the formation. Proper leak-off control may be critical to the success of these and other oilfield treatments. In these and many other treatment types with viscous fluids, after the treatment it is necessary to decrease the viscosity of the fluids, i.e. to break them, including breaking any portion of the fluid that may be in the pores of the formation.

We have found that certain materials can be used as delayed internal breakers; the break may occur naturally due to naturally changing chemical or physical conditions, for example temperature or pH. The break may optionally be accelerated or delayed if necessary. The break may also optionally be triggered by contact with another fluid, such as another injected fluid, a formation fluid, or a produced fluid. Injecting another fluid to promote the break is not normally desirable because of potential costs and complexity, but is within the scope of the Invention. All of the degradable materials of the Invention are breakers for polymer-free (VES) fluid viscosifiers. The internal breaking effect occurs whether or not a filter cake is also formed by the addition of a fluid loss additive or by other (solid) breakers.

The Invention is particularly suited for use with polymer free fluids. The Invention is especially useful in gravel packing and the like, where near-wellbore damage is often a particularly serious problem. The Invention makes it possible to treat wells previously eliminated as candidates for various treatments due to the low fluid efficiency (high leak-off) that would have been expected. The internal breakers may be used as an alternative to some or all of the fluid loss additives that would have been used, especially when filter cakes are undesirable; instead of minimizing fluid loss, the fluid loss may be accepted and the leaked-off fluid broken. Viscosified fluids containing internal breakers may also function as self-destructing diverting agents. They may also be used in kill pills, which can be difficult to break because mechanisms often available for breaking (such as crushing of encapsulated materials, or later addition of another component) cannot usually be used with kill pills.

In treatments that typically include multiple stages, such as most hydraulic fracturing, acid fracturing, frac-packing, and gravel packing embodiments, the internal breaker may be added in the pad, throughout the treatment or to only some of the stages, such as some of the proppant, gravel, acid, or diversion stages. An internal breaker is particularly useful in hydraulic fracturing, frac-packing, and gravel packing because mechanical removal methods are impossible and methods involving contacting the additive with an additional fluid are not always practical. The compositions and methods of the Invention are also particularly useful in cases where it is desirable to allow a certain amount of treatment fluid to enter the formation, for example for the purpose of altering formation wettability or oil or water saturation.

Treatment fluids used with the compositions and methods of the Invention typically also contain other materials such as demulsifiers, corrosion inhibitors, friction reducers, clay stabilizers, scale inhibitors, biocides, breaker aids, mutual solvents, surfactants, anti-foam agents, defoamers, viscosity stabilizers, iron control agents, diverters, emulsifiers, foamers, oxygen scavengers, pH control agents, buffers, and the like. Compatibility of the internal breakers of the Invention with such additives should be checked in the laboratory. The treatments of the Invention are conducted normally; the treatment fluid and additives are transported to the site, mixed, stored, and pumped in the usual ways for the respective chemicals. When Resin Coated Proppants (RCP's) are used, testing should be done to ensure that the RCP's and protein breakers are compatible and that neither interferes with the performance of the other; conventional natural and synthetic proppants and gravels may normally be used without testing.

The Invention is carried out by considering information about the well, the formation, the fluids and additives available, and criteria for a successful treatment, and preparing an optimized plan for maximizing treatment performance according to the data and the criteria. This is usually done by analyzing the well using treatment design and evaluation software; for example, in hydraulic fracturing software, among other factors, pressure gradients are combined with fracture length and height evolution algorithms, complete leak-off information, and the effects of multiple fluid injections and their temperature changes.

The optimal concentration of the internal breaker can be determined by choosing the desired breaking time and rate and measuring the break with samples of the intended fluids under the intended formation conditions. Measurement of breaking, and prediction and control of breaking, are familiar to those of ordinary skill in the arts of well stimulation, sand control, and other oilfield treatments. A suitable concentration of the internal breaker of the Invention is from about 0.05 weight % (of protein component) to about 2 weight %, for example from about 0.1 weight % (of protein component) to about 1 weight %, for example from about 0.1 weight % (of protein component) to about 0.5 weight %. It should be understood that throughout this specification, when we list or describe a concentration or amount range as being useful, or suitable, or the like, we intend that any and every concentration within the range, including the end points, is to be considered as having been stated. Furthermore, each numerical value should be read once as modified by the term "about" (unless already expressly so modified) and then read again as not so modified unless otherwise stated in context. For example, "a range of from 1 to 10" is to be read as indicating each and every possible number along the continuum between about 1 and about 10. In other words, when we express a certain range, even if we explicitly identify or refer to only a few specific data points within the range, or even to no data points within the range, it is to be understood that the inventors appreciate and understand that any and all data points within the range are to be considered to have been specified, and that the inventors have possession of the entire range and all points within the range.

If fluid loss additives are used, it is preferable, although not necessary, to use completely degradable fluid loss additives. Particularly desirable FLA's would be the "internal filter cake/matrix breaker" materials disclosed in copending U.S. Patent Application "Internal Breaker for Oilfield Treatments," inventors Jesse Lee, Philip Sullivan, Erik Nelson, Yiyan Chen, Carlos Abad, Belgin Baser, and Lijun Lin, filed Sep. 18, 2006. When the pad and the fracture fluid are polymer-free and any fluid loss additive used is fully degradable, neither the near-wellbore formation nor the proppant bed left in the fracture after the job contains deleterious polymers or solids, as would be the case if the fracture fluid contained any polymer or if the fluid loss additive was not fully degradable. Therefore fracture conductivity is high and skin is low. Similar arguments hold for other treatments such as gravel packing, acidizing and acid fracturing.

Any non-polymeric fluid, for example VES based fluid, that is compatible with the formation, the formation fluids, and the other components of the fluid, can be used in the Invention. Particularly effective non-limiting examples of fluids are those described in U.S. Pat. Nos. 5,551,516; 5,964,295; 5,979,555; 5,979,557; 6,140,277; and 6,258,859, all hereby incorporated by reference. Vesicle-based fluids may be used, such as those described in U.S. Pat. No. 6,509,301, hereby incorporated by reference.

In some cases, a certain amount of leak-off is desired, for example so that a tip screen-out occurs in fracturing, a condition in which the proppant forms a bridge, preferably at or near the end of the fracture away from the wellbore, stopping the lengthening of the fracture and resulting in a subsequent increase in the fracture width. For example, hydraulic fracturing followed by gravel-packing in a single operation, sometimes called a frac-pac, fracpac, frac pac, frac and pac, or StimPac, sometimes with a deliberate tip screen-out to generate a short wide fracture, is usually performed in relatively high permeability formations for sand-control purposes. However, such operations are sometimes performed in low permeability formations, occasionally for sand control, but also for other reasons, for example to bypass permeability damage near the wellbore caused by scaling or to improve upon poor communication between the wellbore and the formation or a previous fracture, or in formations in which perforating creates damaging fines, or for other reasons. Such jobs designed to generate short wide fractures may also be performed without subsequent gravel-packing when sand control is not an issue. The methods of the present Invention can be used in any of these cases (fracturing followed by gravel packing and/or fracturing for short wide fractures, in either case with or without deliberate tip screen-out).

The acid used in the matrix acidizing and acid fracturing methods of this Invention can be any acid used in acid fracturing, including gelled, self-diverting, and delayed acids. Commonly used, but not limiting, acids are hydrochloric, hydrofluoric, fluoboric, acetic, and formic acids and mixtures thereof, and those acids in the form of oil external emulsions (for reaction rate retardation), or oil internal emulsions (for hydrocarbon solvency). The acids can contain additives such as corrosion inhibitors and chelants used to help dissolve rock components and keep them in solution. Gelled, self-diverting, and delayed acids can be gelled with suitable VES's. Some internal breakers of the Invention may not be compatible with acid, or with strong acid, and laboratory tests should be performed to determine compatibility.

Although in conventional propped fracturing the most common way to control fluid loss is to build an impermeable or reduced-permeability filtercake on the fracture walls (faces), in acid fracturing, especially with a low viscosity ungelled acid, pad viscosity is important for fluid loss control. On the other hand, if the acid is viscosified with a VES system, then if the VES has higher low-shear viscosity than high-shear viscosity, which is common, then as the VES leaks off a short distance into the formation, the flow rate decreases, the shear rate therefore decreases, and the fluid becomes more viscous. Such effects can reduce low viscosity ungelled or weakly gelled acid leak-off better than a wallbuilding system that dissolves or decomposes in acid. In these cases, an internal breaker would be particularly suitable in the pad. This allows acid treatment a certain selected depth into the formation and the acid then performs the very desirable function of diverting subsequent acid, after which it is particularly important that the VES system then be broken, or flow of fluids will continue to be restricted. Similarly, some internal breakers may be used with viscoelastic diverting acids, which are acids containing certain viscoelastic surfactants, such that the fluid has low viscosity as formulated and injected, but increases in viscosity as the acid reacts with the formation, such as a carbonate. Examples of such viscoelastic diverting acid systems were described in U.S. Pat. Nos. 6,399,546, 6,667,280, and 7,028,775 and U.S. Patent Application No. 2003-0119680, all hereby incorporated by reference.

Sometimes acid fracturing is performed with a series of alternating pad, acid, pad, acid, etc. stages in order to optimize coverage. The first, usually but not always non-acidic, pad initiates a fracture for the first acid stage to follow. That first acid stage etches a portion of the fracture face. Subsequent stages of pad and acid repeat the process until the designed treatment volumes have been injected and the desired fracture has been created. In the past, this process has always used a gelled pad, such as one containing a viscoelastic surfactant system, and has usually but not always used an ungelled acid. The internal breaker of the Invention may be used in at least the first pad and sometimes in all the pad stages, and in any gelled VES acid stages. Similarly, matrix acidizing may be performed with alternating stages of acid and another fluid, such as a diverter, some or all of which may be viscosified; the internal breaker of the Invention may be included in some or all of either the acid or the other fluid to break a VES viscosifier. It should be noted that the internal breakers of the Invention may be used for breaking foams and energized fluids as well as straight fluids.

Proteins have been found to be particularly suitable internal breakers. Enzymes are a particularly useful type of protein for this purpose. Not to be limited by theory, but it is believed that the hydrophobic portions of proteins, for example enzymes, disrupt micelles, such as the micelles that give structure (and therefore viscoelasticity) to viscoelastic fluids made with viscoelastic surfactant systems. At room temperature, proteins may be dissolved in water, where they may have globular or folded structures that "hide" hydrophobic regions within a hydrophilic shell; this is the "natural" state in water. In this form, they do not interfere with the micellar structure of the VES fluid. Upon heating, however, the protein molecules de-nature and unfold to expose their hydrophobic cores. This hydrophobic surface acts to break the VES fluid. Such a process is supported by numerous examples from the modern food industry in which proteins are heated to a denaturing temperature to unfold molecules and expose hydrophobic regions. The rate at which the protein molecules denature and break the fluid can be controlled by chemistry. This makes this breaker type particularly attractive since controlled breaks can be customized for applications; some added chemicals slow down the denaturing process. Examples will be shown in which sugars were used to control the break time of a VES fluid. There is no need to rupture an encapsulated material or add another component or change the properties (other than temperature) of the fluid. This allows the breaker to be used for a wide range of applications including gravel packing, matrix acidizing, fracturing, and in foamed fluids. A suitable example of a protein molecule that works in this way is alpha-amylase. In fresh water it is known to denature at temperatures near 200° F. (93.3° C.) to expose a hydrophobic core. Importantly, the protein is essentially inactive as a breaker for VES fluids until the temperature increases to that at which the protein denatures.

Recently egg white proteins have also been tested as breakers for VES fluids, and have also been found effective as viscosity breakers. Denaturing a protein to expose a surface of the protein molecule can allow for any number of interactions. In a related use of proteins as VES breakers, numerous globular proteins, for example albumins such as egg albumin, milk albumin, blood serum albumin; casein, and wheat gluten, have large internal hydrophobic cavities in which hydrophobic molecules can placed and thus can be stored in aqueous solutions but not in contact with water. Such hydrophobic molecules, for example long chain alcohols (for example having from about 8 to about 24 carbons), fatty acids (for example having from about 12 to about 24 carbons), fatty acid esters, mono, di or triglicerides of fatty acids, long chain alcohol phosphate esters, diacid esters (also known as dibasic esters) such as dimethyl butanedioate, dimethyl adipate, other dibasic esters, aliphatic or aromatic hydrocarbons, and mixtures thereof, may be selected because they are VES breakers. Such proteins may then be used as delayed breakers by releasing the hydrophobic entity when the protein is denatured. In another use of enzymes as delayed breakers, the enzymes may attack molecules such as di or triglycerides of fatty acids, and phospholipids such as lecithin and cephalin, which then cleave into hydrophobic pieces that are breakers for VES fluids.

Many proteins may be used in the Invention, provided that their secondary, tertiary or quaternary structures can be altered (for example, denatured) by the conditions (for example, pH, temperature, salinity, solvent, or pressure) that the VES fluid will experience. A denatured protein is one which has lost its functional conformation. Once denatured, a protein loses most, if not all of its biological activity. It is in this non biologically functional form, that the protein may act as an effective breaker for VES fluids. A protein may be denatured through various means including exposure to extremes of heat, pH, salt concentration, denaturing agents like urea/guanidine chloride, and exposure to certain detergents. The denatured proteins work as effective breakers for VES fluids at various conditions and with varying degrees of delay, for example as a function of the pH, temperature, salinity, pressure and molecular composition of the protein. Many different proteins are effective: i) Fibrous proteins such as the cytoskeletal proteins, for example Tubulin, Actin, Keratin, and Myosin; and the extracellular matrix proteins, for example Collagen, Elastin and Reelin; ii) Globular proteins such as the plasma proteins, for example Albumin, and Serum Amyloid; and coagulation factors, for example Fibrin and Thrombin; and hemoproteins, for example Hemoglobin and Myoglobin; and hormones, for example Oxytocin and Insulin; and DNA-binding proteins, for example the Histones; and immune system proteins for example Immunoglobins; iii) Catalytic proteins, for example enzymes, may also be used in the Invention.

The Enzyme Commission number (EC number) is a well-known numerical classification scheme for enzymes, developed by the International Union of Biochemistry and Molecular Biology; it is based on the chemical reactions the enzymes catalyze. As a system of enzyme nomenclature, every EC number is associated with a recommended name for the respective enzyme. Every enzyme code consists of the letters "EC" followed by four numbers separated by periods. Those numbers represent a progressively finer classification of the enzyme. The main types of enzymes that may be used in the present Invention are those in groups EC-1 through EC-6. These groups are: EC 1 Oxidoreductases such as Dehydrogenases, Oxidases, Luciferases, and Reductases; EC 2: Transferases such as Transaminases, and Kinases; EC 3: Hydrolases such as Lipases, Amylases, Peptidases, and Glucosidases; EC 4: Lyases; EC 5: Isomerases; and EC 6: Ligases. Strictly speaking, these EC numbers do not specify enzymes, but enzyme-catalyzed reactions. When different enzymes (for instance from different organisms) catalyze the same reaction, then they receive the same EC number. We intend that the above list of EC numbers represents all of the enzymes that fall within the indicated classes and that catalyze the indicated reactions.

To delay the break, enzymes and proteins may be encapsulated in, for example, fatty acids, polyvinyl alcohol, synthetic resins such as epoxy resins, phenolic resins, acrylate polymers and copolymers, and polylactic acid and polyglycolic acid polymers and copolymers. The solubility and/or the porosity of the coating dictate the time dependent release of the enzyme. The coating is used to delay the release of the enzyme. The coating thickness and type are chosen as a function of the conditions (temperature, pressure, pH and required time delay) for the application of the fluid in the oilfield. The enzyme may be released by diffusion through the coating prior to its complete dissolution, or may be released after dissolution, depending upon the effective radius of the enzyme and the changing porosity of the coating the during dissolution process.

The internal breakers of the Invention may be added to a wellbore fluid by metering them in to the base water fluid as a concentrated liquid. If the material is received as an emulsion or dispersion, it can be stored in that form and used in that form directly. If it is received in dry form (for example as a solid dispersible powder of fine polymer beads or as a dry emulsion) the particles can be pre-dispersed in water or brine as required and metered in as a liquid stream, or alternatively they may be added as solids to the base fluid stream.

The internal breakers of the Invention may also be used in other industries such as household and industrial cleaning.

A particular advantage of many the internal breakers of the Invention is that they and their degradation products are generally not toxic to humans and aquatic animals and are they are typically biodegradable.

The reactivity of a given internal breaker at a particular temperature and in contact with a viscosified fluid or fluids of a particular composition (for example pH and the concentration and nature of other components, especially electrolytes), is readily determined by a simple experiment: exposing the fluid or fluids to the internal breaker under treatment conditions and monitoring the viscosity.

Although the internal breakers of this Invention may be used with VES's made with any type of surfactant, or mixtures of surfactants, with or without one or more co-surfactants, and with or without other additives intended to stabilize or modify the properties of the micelles or vesicles (such as buffers, shear recovery additives, salts, and rheology boosters). Preferred VES's are cationic, anionic, amphoteric, and zwitterionic. Suitable VES's, for example, are described in the following U.S. Patents, all of which are hereby incorporated in their entirety: U.S. Pat. Nos. 5,964,295; 5,979,557; 6,306,800; 6,637,517; and 6,258,859. The viscoelastic surfactant may be, for example, of the following formulae: R-Z, where R is the hydrophobic tail of the surfactant, which is a fully or partially saturated, linear or branched hydrocarbon chain of at least 14 carbon atoms and Z is the head group of the surfactant which may be for example $-NR_1R_2R_3^+$, $-SO_3^-$, $-COO^-$ or, in the case where the surfactant is zwitterionic, $-N^+(R_1)(R_2)R_3-COO^-$ where $R_1$, $R_2$ and $R_3$ are each independently hydrogen or a fully or partially saturated, linear or branched, aliphatic chain of at least one carbon atom; and where $R_1$ or $R_2$ may comprise a hydroxyl terminal group.

Cleavable viscoelastic surfactants, for example of the following formula, may be used, as disclosed in International Patent Application W002/064945: R—X—Y—Z, where R is the hydrophobic tail of the surfactant, which is a fully or partially saturated, linear or branched hydrocarbon chain of at least 18 carbon atoms, X is the cleavable or degradable group of the surfactant which is an acetal, amide, ether or ester bond, Y is a spacer group which is a short saturated or partially saturated hydrocarbon chain of n carbon atoms where n is at least equal to 1, preferably 2 and, when n is equal to or greater than 3, the chain may be a straight or branched saturated or partially saturated chain, and Z is the head group of the surfactant which can $NR_1R_2R_3^+$, $-SO_3^-$, $-COO^-$ or, in the case where the surfactant is zwitterionic, $-N^+(R_1R_2R_3-COO^-)$ where $R_1$, $R_2$ and $R_3$ are each independently hydrogen or a fully or partially saturated, linear or branched, aliphatic chain of at least one carbon atom, possibly comprising a hydroxyl terminal group. Due to the presence of the cleavable or degradable group, cleavable surfactants are able to degrade under downhole conditions.

A nonlimiting example of a suitable cationic viscoelastic surfactant useful for the implementation of the Invention is N-erucyl-N,N-bis(2-hydroxyethyl)-N-methyl ammonium chloride. Nonlimiting examples of some suitable anionic viscoelastic surfactants useful for the implementation of the Invention are monocarboxylates $RCOO^-$ such as oleate where R is $C_{17}H_{33}$ or di- or oligomeric carboxylates such as those disclosed in International Patent Application WO 02/11874.

The protein breakers and methods of this Invention have been found to be particularly useful breakers when used with several types of zwitterionic surfactants. In general, suitable zwitterionic surfactants have the formula:

$$RCONH-(CH_2)_a(CH_2CH_2O)_m(CH_2)_b-N^+(CH_3)_2-(CH_2)_{a'}(CH_2CH_2O)_{m'}(CH_2)_{b'}COO^-$$

in which R is an alkyl group that contains from about 11 to about 23 carbon atoms which may be branched or straight chained and which may be saturated or unsaturated; a, b, a', and b' are each from 0 to 10 and m and m' are each from 0 to 13; a and b are each 1 or 2 if m is not 0 and (a+b) is from 2 to about 10 if m is 0; a' and b' are each 1 or 2 when m' is not 0 and (a'+b') is from 1 to about 5 if m is 0; (m+m') is from 0 to about 14; and $CH_2CH_2O$ may also be oriented as $OCH_2CH_2$. Preferred surfactants are betaines and amidoamine oxides.

Two examples of betaines are oleylamidopropyl dimethyl betaine and erucylamidopropyl dimethyl betaine. Oleylamidopropyl dimethyl betaine contains an oleyl acid amide group (including a $C_{17}H_{33}$ alkene tail group); erucylamidopropyl dimethyl betaine contains an erucic acid amide group (having a $C_{21}H_{41}$ tail group). Betaine surfactants, and others that are suitable, are described in U.S. Pat. No. 6,258,859.

Although the Invention has been described throughout using the term "VES", or "viscoelastic surfactant" to describe the non-polymeric viscosified aqueous fluid, any non-polymeric material may be used to viscosity the aqueous fluid provided that the requirements described herein for such a fluid are met, for example the required viscosity, stability, compatibility, and lack of damage to the wellbore, formation or fracture face. Examples, without regard to whether they form, or are described as forming, vesicles or viscoelastic fluids, include, but are not limited to, those viscosifiers described in U.S. Pat. No. 6,035,936 and in GB application No. 2,366,307A.

Also optionally, fracturing fluids may contain materials designed to assist in proppant transport and/or to limit proppant flowback after the fracturing operation is complete by forming a porous pack in the fracture zone. Such materials can be any known in the art, such as are available from Schlumberger under the tradename PropNET™ (for example see U.S. Pat. No. 5,501,275). Exemplary proppant flowback inhibitors include fibers or platelets of novoloid or novoloid-type polymers (U.S. Pat. No. 5,782,300).

The choice and concentration of internal breaker and associated additives (appropriate delay agents or accelerating agents) is based primarily on the desired time before the delayed break, which will depend upon the choice and concentration of VES and the temperature, and upon the size of the job, the nature of the job, and other factors known to those of ordinary skill in the art. Suitable choices and concentrations may be determined by simple laboratory experiments, for example by mixing all the components, heating to the job temperature, and monitoring the viscosity. A requirement is compatibility of the water with the VES system and the internal breaker (protein breakers may be salinity and pH sensitive). The system comprising an internal breaker also works with VES systems that contain co-surfactants or other additives commonly included in oilfield treatment fluids. Again, a requirement is compatibility of the internal breaker, the VES system, and the other components. The fluid containing an internal breaker may be batch-mixed or mixed on-the-fly.

Any additives normally used in such treatments may be included, again provided that they are compatible with the other components and the desired results of the treatment. Such additives can include, but are not limited to antioxidants, corrosion inhibitors, delay agents, biocides, buffers, fluid loss additives, etc. The wellbores treated can be vertical, deviated or horizontal. They can be completed with casing and perforations or open hole.

In gravel packing, or combined fracturing and gravel packing, it is within the scope of the Invention to apply the compositions and methods of the Invention to treatments that are done with or without a screen. Although treatments are normally done to promote hydrocarbon production, it is within the scope of the Invention to use the compositions and methods of the Invention in wells intended for the production of other fluids such as carbon dioxide, water or brine, or in injection wells. Although we have described the Invention in terms of unfoamed fluids, fluids foamed or energized (for example with nitrogen or carbon dioxide or mixtures thereof) may be used. Adjustment of the appropriate concentrations due to any changes in the fluid properties (or other parameters, such as proppant concentration) consequent to foaming would be made.

EXAMPLES

Figure 1:
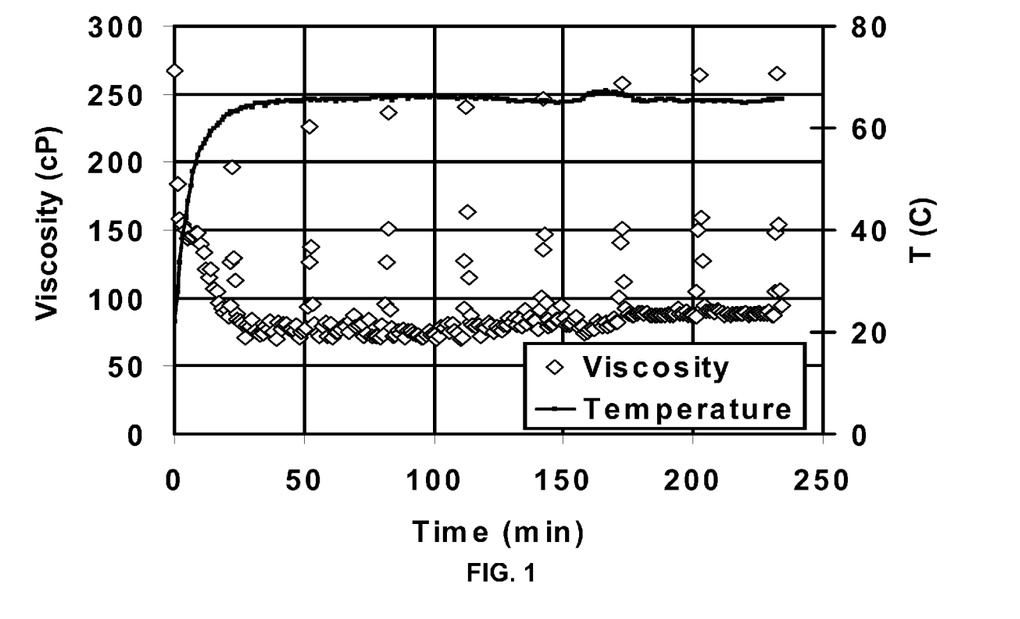
FIG. 1 shows the effect of a protein breaker of the Invention on the viscosity of a viscoelastic surfactant fluid at 65.6° C.
Figure 2:
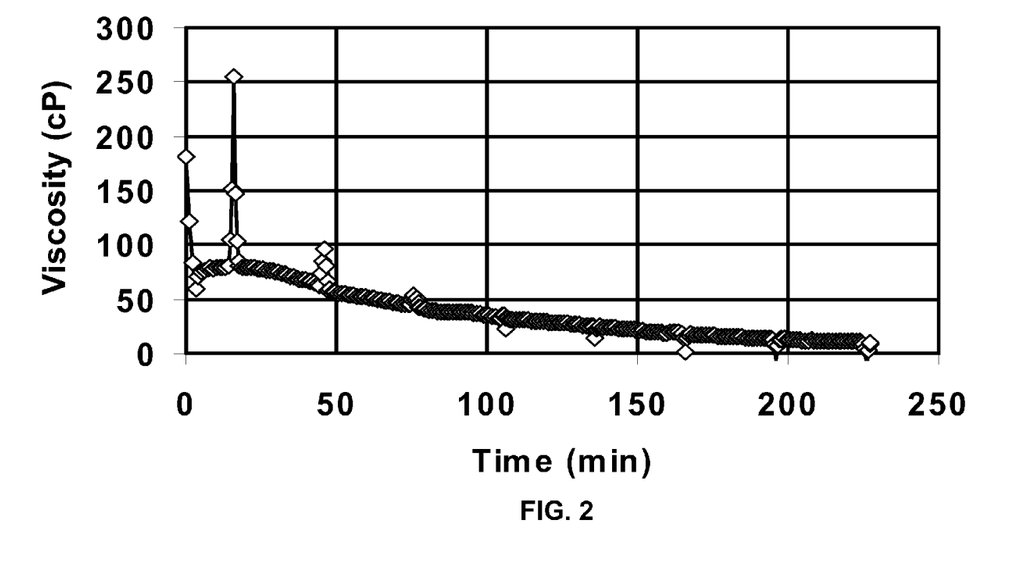
FIG. 2 shows the effect of a protein breaker of the Invention on the viscosity of a viscoelastic surfactant fluid at 93.3° C.
Figure 3:
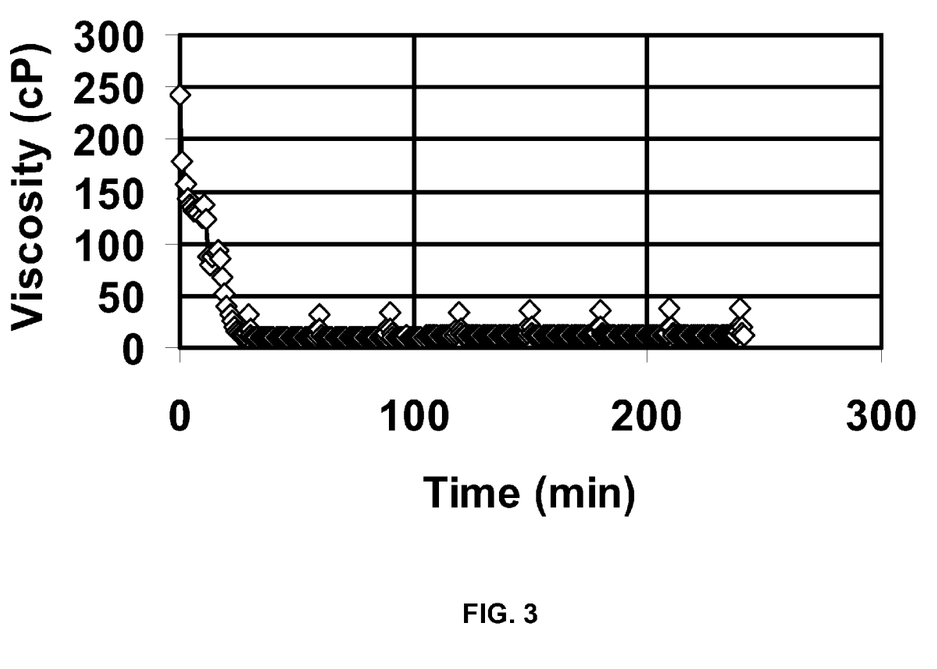
FIG. 3 shows the effect of a protein breaker of the Invention on the viscosity of a viscoelastic surfactant fluid at 121° C.

Enzymes An example of a suitable protein molecule is alpha-amylase; experiments demonstrate that alpha-amylase progressively breaks a VES fluid. The VES fluid system investigated was made with 6% of a viscoelastic surfactant concentrate containing about 38 weight % erucylamidopropyl dimethyl betaine surfactant, 1.1 weight % polynaphthalene sulfonate, 22 weight % isopropanol, 5 weight % sodium chloride and the remainder water. As shown in FIG. 1 at 150° F. (65.6° C.), FIG. 2 at 200° F. (93.3° C.), and FIG. 3 at 250° F. (121° C.), VES fluids containing this protein molecule progressively lost viscosity with time at temperature. At the lowest temperature, there was no break, and in fact the VES appeared to have been slightly stabilized; at the intermediate temperature, the break was slow and incomplete; at the highest temperature, the break was fast, and was complete by the time the fluid had reached the test temperature. The protein was added as 11 weight % of a mixture containing 8 weight % d-sorbitol, 18% sodium chloride, 72% water, and 1.4-1.5% 1,4-alpha-d-glucan glucanohydrolase. Laboratory work with the addition of only the other ingredients in the mixture to the fluid did not show any such break effect, confirming that the protein molecule was causing the break. Also, it should be noted that "natural" alpha amylase, which is an enzyme for starch hydrolysis, has no enzymatic activity for betaine surfactants. In fact, laboratory testing further showed that when the protein was denatured separately from the surfactant and then the two components were combined, the denatured enzyme still broke the fluid.

Figure 4:
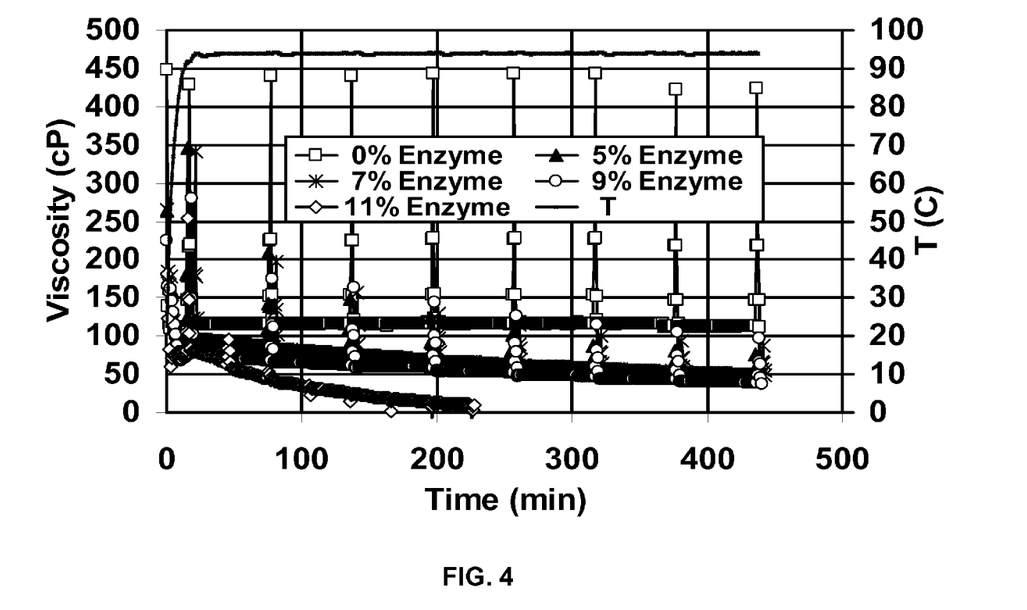
FIG. 4 shows the effect of a protein breaker of the Invention on the viscosity of a viscoelastic surfactant fluid at 93.3° C. as a function of protein breaker concentration.

FIG. 4 shows experiments in which the same VES fluid and varying amounts of the same enzyme concentrate as were used in the experiments just described, were heated at 200° F. (93.3° C.) in a Fann 50 rheometer while the viscosity was monitored. It can be seen that with from 5 to 9 weight % of the enzyme concentrate, there was a very slow break; with 11% of the enzyme concentrate, there was a slow and steady break that took about 3 to 4 hours.

Figure 5:
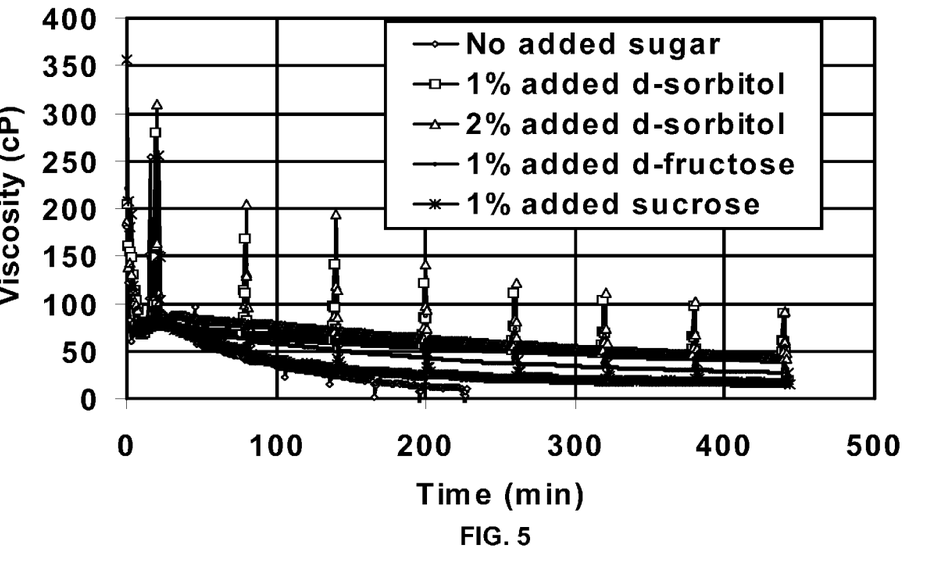
FIG. 5 shows the effect of various sugars as delay agents on the performance of a protein breaker of the Invention at 93.3° C.

FIG. 5 shows experiments with added sugars to delay the break. These experiments were done with the same VES fluid as above, and 11 weight % of the same enzyme concentrate, at 200° F. (93.3° C.). It can be seen that 1 weight % added sucrose slowed the break; 1 weight % added d-fructose slowed the break a little more; 1% added d-sorbitol slowed the break even more; and 2% added d-sorbitol slowed the break the most. With the added d-sorbitol, the fluid was almost unbroken after over 7 hours.

Figure 6:
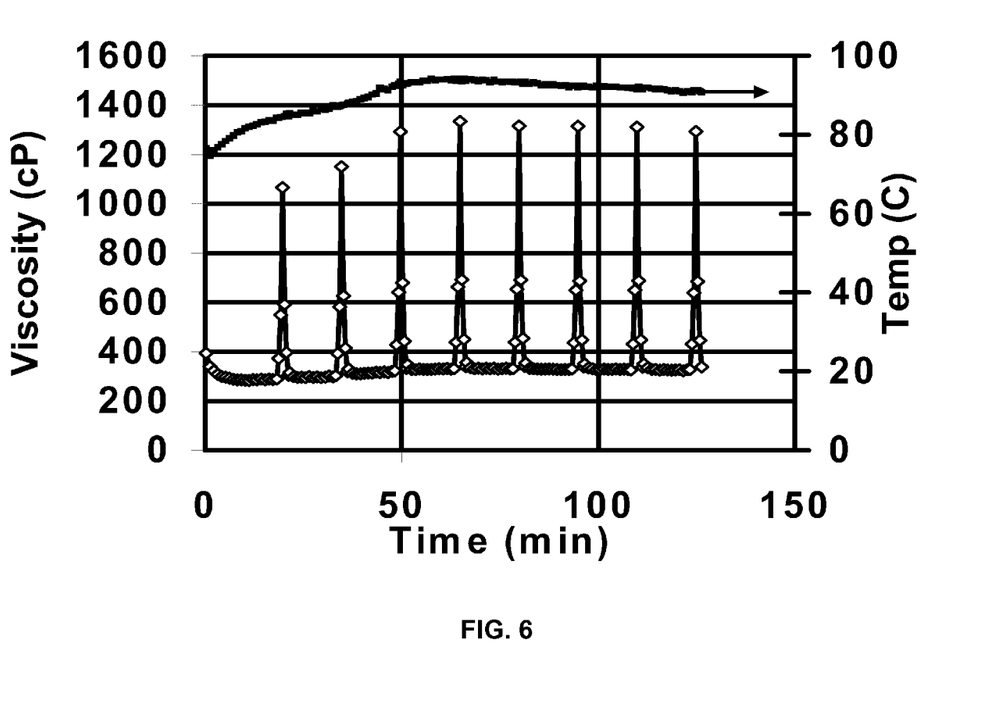
FIG. 6 shows the effect of a protein breaker of the Invention on the viscosity of a viscoelastic surfactant fluid at 32.2° C.
Figure 7:
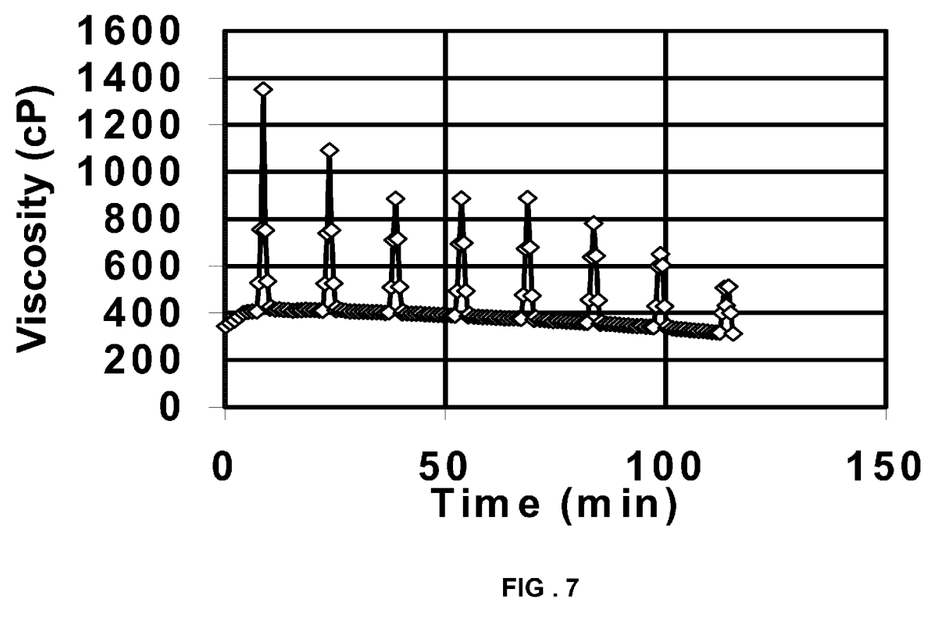
FIG. 7 shows the effect of a protein breaker of the Invention on the viscosity of a viscoelastic surfactant fluid at 54.4° C.
Figure 8:
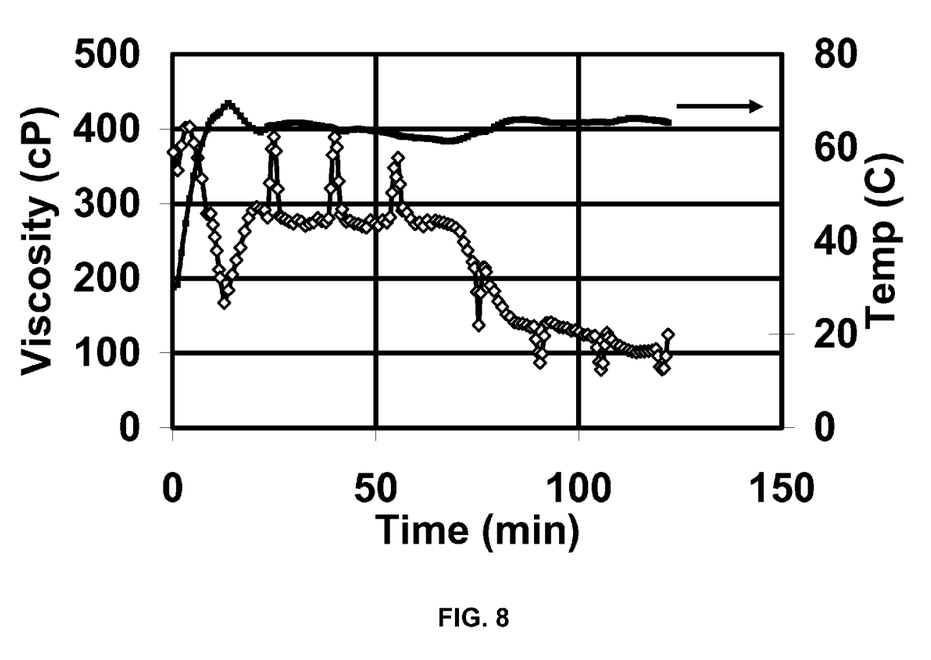
FIG. 8 shows the effect of a protein breaker of the Invention on the viscosity of a viscoelastic surfactant fluid at 65.6° C.
Figure 9:
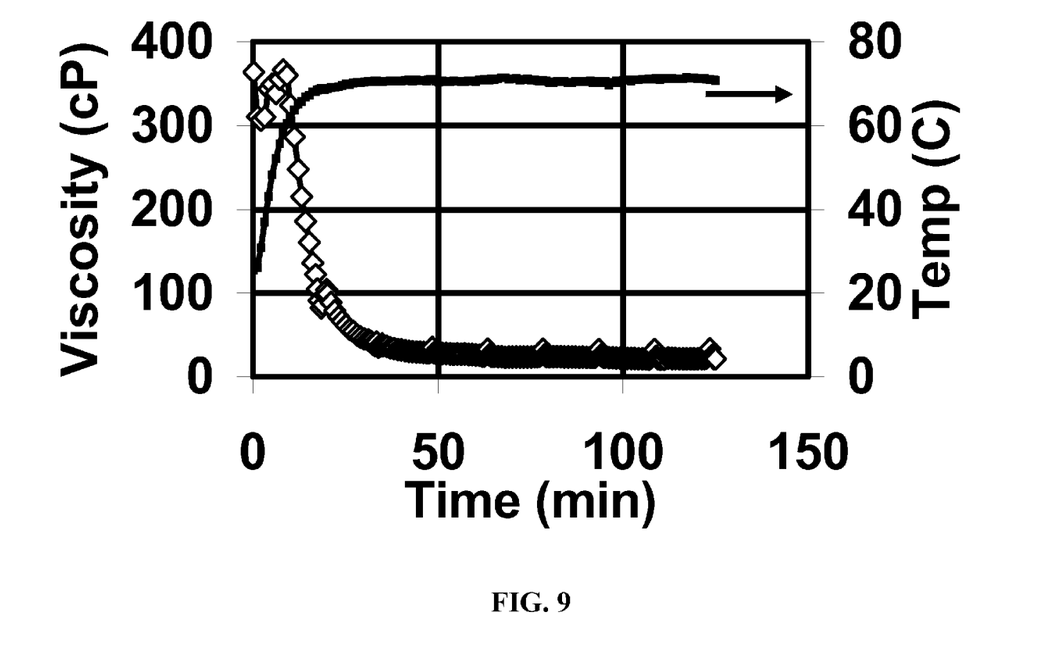
FIG. 9 shows the effect of a protein breaker of the Invention on the viscosity of a viscoelastic surfactant fluid at 71.1° C.
Figure 10:
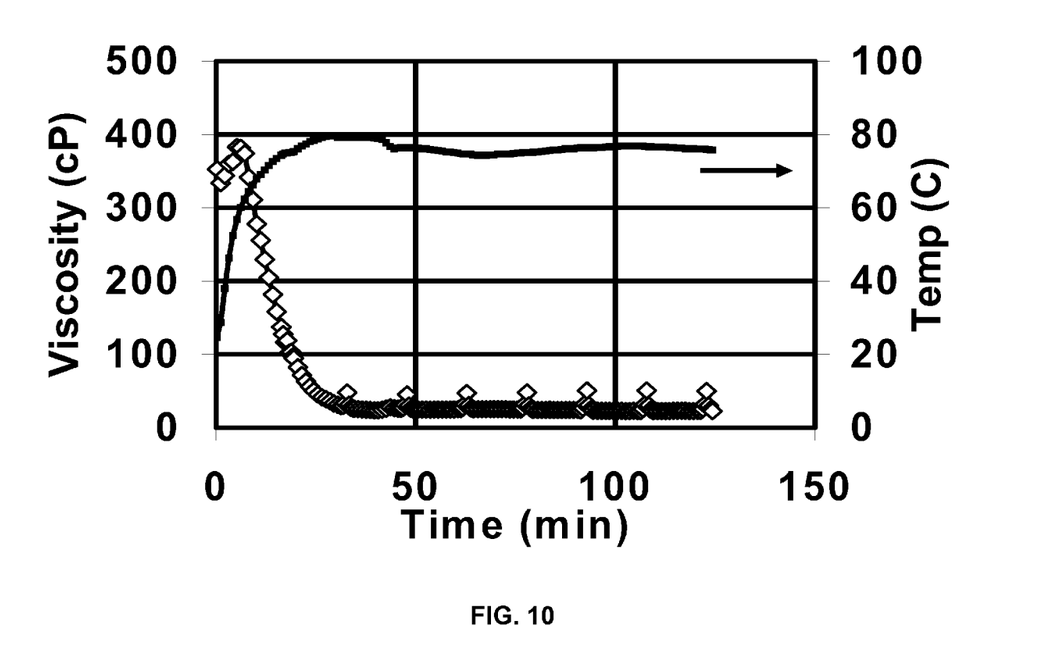
FIG. 10 shows the effect of a protein breaker of the Invention on the viscosity of a viscoelastic surfactant fluid at 76.7° C.

Egg White The same VES system was used as in the examples above. The protein used was dried egg whites obtained as Deb-El™ 100% Dried Egg Whites from Deb-El Food Products, Elizabeth, NJ, U.S.A. In a first set of experiments, 1 weight % dried egg whites was added to the VES fluid and heated to a pre-selected temperature in a Fann 50 Rheometer. At temperatures of 32.2, 37.8, 43.3, and 48.9° C. (90, 100, 110, and 120° F.) there was no affect. Typical results are shown in FIG. 6 for 32.2° C. (90° F.). FIG. 7 shows the results with 1 weight % dried egg whites at 54.4° C. (130° F.); it can be seen that there was a very gradual break. FIG. 8 shows the results with 0.5 weight % dried egg whites at 65.6° C. (150° F.); it can be seen that after a delay of a little over 1 hour after the system reached temperature, a break began that was faster than that shown in FIG. 7. FIG. 9 shows the results with 0.5 weight % dried egg whites at 71.1° C. (160° F.); it can be seen that the fluid was nearly completely broken by the time the system reached temperature. The same can be seen in FIG. 10 for a system with 0.5 weight % dried egg whites at 76.7° C. (170° F.). Not shown is that at 93.3° C. (200° F.) with 1 weight % egg whites the fluid was completely broken before the intended temperature was reached.

What is claimed is:

1. A method of treating a subterranean formation penetrated by a wellbore comprising a) injecting into the formation a fluid comprising a non-polymeric viscosifier that acts by creating a three dimensional structure in the fluid, and a breaker comprising a fibrous protein, and b) allowing said protein to disrupt said structure, wherein said fibrous proteins is selected from the group consisting of cytoskeletal proteins and extracellular matrix proteins.

2. The method of claim 1 wherein said non-polymeric viscosifier comprises a viscoelastic surfactant.

3. The method of claim 2 wherein said viscoelastic surfactant is selected from a betaine and an amidoamine oxide.

4. The method of claim 1 wherein said protein comprises egg white.

5. The method of claim 4 wherein said fluid further comprises a sugar.

6. The method of claim 5 wherein said sugar is selected from sucrose, d-fructose, and d-sorbitol.

7. The method of claim 1 wherein said protein comprises alpha-amylase.

8. The method of claim 1 wherein said step of allowing said protein to disrupt said structure is delayed by enclosing said protein in a member selected from the group consisting of fatty acids, polyvinyl alcohols, synthetic resins, phenolic resins, acrylate polymers and copolymers, lactic acid and glycolic acid polymers and copolymers, and mixtures thereof.

9. A method of treating a subterranean formation penetrated by a wellbore comprising a) injecting into the formation a fluid comprising a non-polymeric viscosifier that acts by creating a three dimensional structure in the fluid, and a breaker comprising a globular protein, and b) allowing said protein to disrupt said structure, wherein said globular proteins is selected from the group consisting of plasma proteins, coagulation factors, hemoproteins, hormones, DNA-binding proteins, and immune system proteins.

10. The method of claim 9 wherein said non-polymeric viscosifier comprises a viscoelastic surfactant.

11. The method of claim 10 wherein said viscoelastic surfactant is selected from a betaine and an amidoamine oxide.

12. The method of claim 9 wherein said protein comprises egg white.

13. The method of claim 9 wherein said protein comprises alpha-amylase.

14. The method of claim 13 wherein said fluid further comprises a sugar.

15. The method of claim 14 wherein said sugar is selected from sucrose, d-fructose, and d-sorbitol.

16. A method of treating a subterranean formation penetrated by a wellbore comprising a) injecting into the formation an aqueous fluid comprising a non-polymeric viscosifier that acts by creating a three dimensional structure in the fluid, and a globular protein containing a breaker for said viscosifier, and b) allowing said protein to release said breaker.

17. The method of claim 16 wherein said globular protein is selected from albumins, caseins, and glutens.

18. The method of claim 16 wherein said breaker is selected from the group consisting of long chain alcohols, fatty acids, fatty acid esters, mono, di or triglicerides of fatty acids, long chain alcohol phosphate esters, diacid esters, aliphatic hydrocarbons, aromatic hydrocarbons, and mixtures thereof.

* * * * *